United States Patent
Yoshida et al.

[11] Patent Number: 6,124,031
[45] Date of Patent: Sep. 26, 2000

[54] THERMOPLASTIC POLYESTER COMPOSITION AND FILM MADE THEREFROM

[75] Inventors: Minoru Yoshida, Mishima; Toshihiro Sasaki, Susono; Toshiaki Ueda, Otsu; Masatoshi Aoyama, Mishima; Masaru Suzuki, Ito, all of Japan

[73] Assignee: Toray Industries, Inc., Japan

[21] Appl. No.: 08/119,075

[22] PCT Filed: Jan. 27, 1993

[86] PCT No.: PCT/JP93/00073

§ 371 Date: Sep. 22, 1993

§ 102(e) Date: Sep. 22, 1993

[87] PCT Pub. No.: WO93/15145

PCT Pub. Date: Aug. 5, 1993

[30] Foreign Application Priority Data

Jan. 24, 1992 [JP] Japan ..................................... 4-011032
Jun. 19, 1992 [JP] Japan ..................................... 4-160605

[51] Int. Cl.[7] ....................................................... B32B 5/16
[52] U.S. Cl. .......................... 428/329; 428/327; 428/328; 428/330; 428/331; 428/480; 524/430
[58] Field of Search ..................................... 524/430, 425, 524/492, 493, 447, 417; 428/141, 327, 328, 329, 330, 331, 480

[56] References Cited

U.S. PATENT DOCUMENTS 5,252,388 10/1993 Murooka et al. ........................ 428/328

FOREIGN PATENT DOCUMENTS

| | | |
|---|---|---|
| 0 490 665 A1 | 6/1992 | European Pat. Off. . |
| 1-263025 | of 0000 | Japan . |
| 1-306220 | of 0000 | Japan . |
| 2-12923 | of 0000 | Japan . |
| 2-214733 | of 0000 | Japan . |
| 2-214734 | of 0000 | Japan . |
| 3-131633 | of 0000 | Japan . |
| 3-43447 | of 0000 | Japan . |
| 3-6238 | of 0000 | Japan . |
| 3-6239 | of 0000 | Japan . |
| 63-267550 | of 0000 | Japan . |
| 63-289028 | of 0000 | Japan . |
| 3-146709 | 6/1991 | Japan . |
| 3-69379 | 10/1991 | Japan . |

Primary Examiner—James J. Seidleck
Assistant Examiner—U. K. Rajguru
Attorney, Agent, or Firm—Austin R. Miller

[57] ABSTRACT

Disclosed are a thermoplastic polyester composition comprising a thermoplastic polyester (A) prepared from an acid component mainly comprising an aromatic dicarboxylic acid and a glycol component mainly comprising an aliphatic glycol and θ-type aluminum oxide particles (B); a thermoplastic polyester composition comprising the thermoplastic polyester (A) and a mixture (C) of two or more kinds of aluminum oxide particles different from each other in crystal structure; and films made from these compositions. Particularly, the films formed from the compositions can have excellent slipping property, abrasion resistance, and scratch resistance in repeated high-speed running.

17 Claims, 1 Drawing Sheet

THERMOPLASTIC POLYESTER COMPOSITION AND FILM MADE THEREFROM

TECHNICAL FIELD OF THE INVENTION

The present invention relates to a thermoplastic polyester composition and films made therefrom, and more particularly, relates to a thermoplastic polyester composition suitable for obtaining formed bodies (films or fibers) excellent in slipping property, abrasion resistance and scratch resistance (property hardly causing scratches) by uniformly dispersing fine aluminum oxide particles having specified crystal structures in the thermoplastic polyester composition.

BACKGROUND ART OF THE INVENTION

Generally, a thermoplastic polyester, for example, polyethylene terephthalate, has excellent mechanical properties, and is broadly used for a formed product of a film, a fiber, etc.

Usually, in the polyester, inert particles are contained in the polyester and thereby form protrusions on the back surface of a formed product for the purpose of giving a slipping property to the formed product. Although there are various kinds of particles as such inert particles, there is a problem that generally inert particles are poor in affinity with polyester and in abrasion resistance.

To solve this problem, investigations with respect to surface treatment have been carried out. For example, JP-A-SHO 63-221158 and JP-A-SHO 63-280763 propose to improve the surfaces of colloidal silica particles by a glycol group, JP-A-SHO 63-312345 proposes to improve the surfaces of colloidal silica particles by a coupling agent, and JP-A-SHO 62-235353 proposes a surface treatment of calcium carbonate particles by a phosphorus compound.

However, even if such conventional methods are applied, in a case of use with a contact running and friction such as a magnetic tape, particles are likely to fall off. Therefore, use of particular particles is recently proposed. Specifically, it is proposed that aluminum oxide particles have a great advantage for increase of abrasion resistance, for example, in JP-A-HEI 2-129230 (delta-type aluminum oxide particles) and in JP-A-HEI 2-38444 (aluminum oxide particles).

However, even if such methods are applied, when a film is brought into contact with a guide pin and repeatedly runs at a high speed, the abrasion resistance and the scratch resistance thereof are insufficient.

The inventors of the present invention have found that the abrasion resistance and scratch resistance of a polyester film depend upon the kind of particles present in the polyester film, and have reached the present invention as the result of earnest investigation.

An object of the present invention is to solve the above-mentioned disadvantages in the conventional technologies, and to provide a thermoplastic polyester composition excellent in all of slipping property, abrasion resistance and scratch resistance, particularly a thermoplastic polyester composition from which films and fibers excellent in abrasion resistance in repeated high-speed running can be made.

DISCLOSURE OF THE INVENTION

The object of the present invention is accomplished by the following constitution.

A thermoplastic polyester composition characterized in that the composition comprises a thermoplastic polyester (A) prepared from an acid component mainly comprising an aromatic dicarboxylic acid and a glycol component mainly comprising an aliphatic glycol and θ-type aluminum oxide particles (B); or a thermoplastic polyester composition characterized in that the composition comprises a thermoplastic polyester (A) prepared from an acid component mainly comprising an aromatic dicarboxylic acid and a mixture (C) of two or more kinds of aluminum oxide particles different from each other in crystal structure.

The aluminum oxide particles used in the present invention are θ-type aluminum oxide particles (B), or a mixture (C) of two or more kinds of aluminum oxide particles different from each other in crystal structure.

The mixture (C) of two or more kinds of aluminum oxide particles different from each other in crystal structure means a mixture of α-type aluminum oxide particles well known, γ-type, δ-type, η-type, θ-type, κ-type and χ-type activated aluminum oxide particles, amorphous aluminum oxide particles, etc.

There are various known methods for synthesizing the particles with the above-described crystal structures. For example, it is possible to synthesize δ-type aluminum oxide particles by blowing hydrogen and oxygen into aluminum chloride and hydrolyzing it in a gaseous phase, amorphous aluminum oxide particles by blowing steam into aluminum oxide and hydrolyzing it in a gaseous phase, γ-type aluminum oxide particles by thermal decomposition of an alum, θ-type, γ-type and δ-type aluminum oxide particles by thermal decomposition of an alum after neutralization in a carbonate, θ-type and γ-type aluminum oxide particles by calcining an aluminum hydroxide prepared by hydrolysis of an aluminum alkoxide, and η-type, θ-type and γ-type aluminum oxide particles by calcining an aluminum hydroxide prepared by spark discharging aluminum metal pellets in water. Further, when such synthesized activated alumina particles are calcined at a high temperature of not less than 1,300° C., α-type aluminum oxide particles can be obtained in any case. The α-type aluminum oxide particles can be synthesized not only by such a method but also by a method usually called "Bayer's process".

It is necessary to select a synthesis method and set calcination temperature and time in order to determine such crystal structures. In the present invention, it is also very important by which synthesis method the selected particles are prepared.

θ-type aluminum oxide particles or two or more kinds of aluminum oxide particles different from each other in crystal structure, which are selected from activated aluminum oxide particles synthesized by calcining an aluminum hydroxide prepared by hydrolysis of an aluminum alkoxide or α-type aluminum oxide particles calcined at a higher temperature, may be preferred from the following reasons. Particularly, use of two or more kinds of aluminum oxide particles different from each other in crystal structure is preferred.

In more detail, θ-type or a mixing type of θ-type and other type crystal structures is preferred. As the mixing type, θ-type and α-type, θ-type and δtype, θ-type and γ-type, θ-type and η-type, θ-type and δ-type and η-type, θ-type and δ-type and α-type, θ-type and δ-type and η-type, θ-type and γ-type and α-type, θ-type and γ-type and η-type, and θ-type and η-type and α-type can be employed. Among these types, θ-type, θ-type and δ-type, θ-type and γ-type, θ-type and α-type, θ-type and δ-type and α-type, and θ-type and γ-type and α-type are preferred. Furthermore, mixing two or more types of components, such as θ-type and δ-type, θ-type and γ-type, θ-type and α-type, θ-type and δ-type and α-type, and θ-type and γ-type and α-type, is preferred.

In spite of the above description, at least θ-type aluminum oxide particles may be contained, and a mixture containing four or more kinds of aluminum oxide particles different from each other in crystal structure is included in the concept of a mixture of two or more kinds of aluminum oxide particles different from each other in crystal structure according to the present invention.

In a case of use of such a mixture of two or more kinds of aluminum oxide particles, the mixing ratio of θ-type aluminum oxide particles to the total amount aluminum oxide particles is preferably more than 0.3 by weight more preferably more than 0.5.

The specific surface area of primary particle of the above-described aluminum oxide particles is preferably not less than 10 m$^2$/g as a value represented by specific surface area, more preferably not less than 50 m$^2$/g. Further, it is preferably not more than 600 m$^2$/g, particularly preferably not more than 200 m$^2$/g.

The primary particle diameter of the particles is preferably not less than 3 nm and not more than 200 nm, more preferably not less than 5 nm and not more than 100 nm. The primary particle diameter is calculated from the specific surface area, as described later in item (1) of properties of particles.

As a shape of a particle, not a sphere but an acicular or a platy shape is preferred. Where, the "acicular or platy" means that the shape of a primary particle is not isometric.

Such a shape of a particle can be recognized by a transmission type electron microscope. Namely, when a polymer containing particles is cut to a very thin sample along an appropriate direction and the sample is observed by a transmission type electron microscope, for example, in a case of spherical particles, all particles are observed as the same formation, but, in a case of, for example, platy particles, because the particles are randomly present, the observation is carried out in the same condition as one where a single particle is observed from various directions, and as a result, the particles are observed as a mixture of particles having a plate-shape, a rod-shape, etc. Therefore, the shape of the particles can be determined by this method. Similarly, in a case of acicular particles, the particles are observed as a mixture of particles having an acicular shape and a spherical shape in the observation from the axial direction, and thereby the shape of the particles can be determined.

The definition of "acicular or platy" according to the present invention will be explained more concretely.

A circle circumscribing a primary particle observed by a transmission type electron microscope is depicted such that the diameter is minimized, and the diameter of the circumscribing circle is expressed as "$l_1$". A circle inscribing the primary particle is depicted such that the diameter is maximized and the diameter of the inscribing circle is expressed as "$l_2$". The acicular or platy particle according to the present invention means a particle with a ratio of $l_1/l_2$ of not less than 2, preferably not less than 2 and not more than 20, more preferably not less than 2 and not more than 10.

Examples of this relationship between $l_1$ and $l_2$ are illustrated in FIGS. 1A, 1B, 1C and 1D. In the figures, circles 2a, 2b, 2c and 2d circumscribing respective primary particles 1a, 1b, 1c and 1d are depicted such that each diameter is circles 3a, 3b, 3c and 3d inscribing the respective primary particles 1a, 1b, 1c and 1d are depicted such that each diameter is maximized and the ratios of diameters of the circumscribing circles and the inscribing circles are determined as $l_1/l_2$, respectively.

The acicular or platy particles preferred in the present invention can be selectively obtained by an aforementioned method for calcining an aluminum hydroxide prepared from an aluminum alkoxide by hydrolysis.

However, such fine particles are liable to agglomerate, and generally the particles are present in a slurry or a polymer as agglomerated secondary particles. If such an agglomeration progresses, excessively large particles are formed as the case may be, and when used for films or fibers, the portions including such agglomerated particles are chipped and the chipped portions fall down. This is not desirable.

The secondary particle diameter can be freely selected depending upon the purpose of the formed product made from the thermoplastic polyester composition. When used for films or fibers, if the secondary particle diameter is too large, excessive large protrusions generate on the formed product. Therefore, the secondary particle diameter is preferably not more than 1.0 μm, more preferably not more than 0.6 μm. Further, it is preferably not less than 0.01 μm The secondary particle diameter is defined as follows. When formed as a biaxially stretched film, the interior of the film is observed by a transmission type electron microscope. In the observation, the lengths L (μm) of 500–1,000 agglomerated secondary particles in a direction parallel to the film surface are measured, and the number average diameter Lav (μm) of the lengths is defined as the secondary particle diameter.

Although such a secondary particle diameter has a distribution of particle size in a biaxially stretched film, when the value of L is determined as a number distribution of particle diameter, the rate of secondary particles having a diameter of not more than 0.05 μm is preferably not less than 20% and not more than 60%. Further, when the lengths in a direction perpendicular to the film surface of such secondary particles is represented as D (μm), the lengths are preferably in the range defined by the following equation.

$$0.05 \leq D/L \leq 0.6$$

The secondary particle preferably contains at least one acicular or platy primary particle aforementioned. When the secondary particles are observed by a transmission type electron microscope, the rate of the agglomerated particles each containing at least one acicular or platy primary particle is preferably not less than 50% relative to the total number of agglomerated particles, more preferably not less than 70%.

When formed as a film, fine protrusions originating from aluminum oxide particles can be formed on the film surface by such formation and distribution of the agglomerated secondary particles.

With respect to the protrusions on the film surface as formed above, the number of protrusions having a height of 10–60 nm is preferably not less than 500,000/mm$^2$ and not more than 5,000,000/mm$^2$, more preferably not less than 700,000/mm$^2$ and not more than 2,000,000/mm$^2$.

Such fine protrusions exist between large protrusions formed originating from inert particles used together, which are described later, and protect the surface of the film, and thereby increasing the scratch resistance in repeated high-speed running.

The content of aluminum oxide particles can be determined depending upon the purpose of a product formed from the thermoplastic polyester composition. However, because the aluminum oxide particles are necessary to increase the abrasion resistance and scratch resistance in repeated high-speed running, if the content is too small, the advantages to be achieved cannot be obtained. If the content is too large, excessive large protrusions are formed on a product to be formed. Therefore, the total content of the aluminum oxide particles is preferably in the range of 0.01–10 parts by weight relative to the thermoplastic polyester composition of 100 parts by weight, more preferably in the range of 0.05–1 part by weight.

As a method for adding aluminum oxide particles to polyester, a method for adding them in polyester reaction system or a method for blending them in a molten polymer can be used. The former method is preferred from the viewpoint of dispersion property of the particles. In a case of addition of aluminum oxide particles having two or more kinds of crystal structures, the respective aluminum oxide particles may be added separately, and they may be added simultaneously. A method for adding two or more kinds of particles simultaneously as a mixture is more preferred from the viewpoint of dispersion property of the particles.

Although the timing of the addition of the particles is not particularly restricted, the timing before transesterification or the timing from a time before transesterification to a time of the latter half of condensation polymerization is preferred. Further, the particles are added preferably under a condition in which the polymerization degree of polyester is not more than 0.30 in intrinsic viscosity which is determined by dissolving the polyester in o-chlorophenol at 25° C.

As the formation of the particles when the particles are added to the reaction system, the aluminum oxide particles may be added as they are, and alternatively, the aluminum oxide particles may be added is the form of a slurry. The formation of a slurry dispersing the particles in a condition of presence of a solvent is more preferable.

When the particles are wet dispersed in a condition of presence of a solvent, because the viscosity increases, the content of the aluminum oxide particles is preferably in the range of 1–50% by weight, more preferably in the range of 3–30% by weight. Although the solvent of this dispersion treatment is not particularly restricted, it is preferably a glycol component such as a main raw material or a copolymerized component of the polyester in consideration of the fact that the slurry containing the particles are thereafter added to the polyester. Concretely, ethylene glycol, tetramethylene glycol, hexamethylene glycol, diethylene glycol, propylene glycol, butane diol, neopentylglycol, polyoxyalkylene glycol, p-xylylene glycol, 1,4-cyclohexanedimethanol, 5-sodiumsulforesorcinol, etc., can be used. As the dispersion treatment, a usual agitation, an ultrasonic treatment, or a medium-type dispersion treatment can be employed. Among these treatments, a medium-type dispersion treatment represented by a treatment such as one using a sand grinder is preferred.

In the treatment, a dispersing agent or a surface treatment agent may be used together, as needed. Although there are many kinds in such a dispersing agent or a surface treatment agent, an agent, which has a good affinity with polyester when it is added in the polyester, is preferred. In more detail, a compound, which has one selected from an acid functional group such as a sulfonic acid, a phosphonic acid and a carboxylic acid or metal salts thereof, and has at least one functional group selected from a carboxylic acid, a carboxylic ester, a hydroxyl group and an epoxy group, is preferred. As the compound satisfying this condition, a low molecular compound such as sulfobenzoic acid, sulfobenzoic ethylene glycol ester or 5-sodium sulfoisophthalic methylester, or a polymer compound such as polyacrylic acid, poly(acrylic acid/acrylic methylester) copolymer, poly(acrylic acid/methacrylic methylester) copolymer or poly(acrylic acid/methacrylic polyethylene glycol ester) copolymer, can be employed. However, the compound is not limited by these compounds.

As the aromatic dicarboxylic acid according to the present invention, terephthalic acid, isophthalic acid, naphthalene-2,6-dicarboxylic acid, 5-sodium sulfoisophthalic acid, etc. can be used. As the aliphatic glycol according to the present invention, ethylene glycol, diethylene glycol, propylene glycol, butane diol, tetramethylene glycol, hexamethylene glycol, neopentyl glycol, polyoxyalkylene glycol, etc. can be used. As the thermoplastic polyester composition comprising the aromatic dicarboxylic acid and the aliphatic glycol, polyethylene terephthalate, polybutylene terephthalate, polyethylene-2,6-naphthalate, etc. can be used. The polyester may be a homopolyester or may be a copolyester containing a copolymerized component. As the copolymerized component, a dicarboxylic acid component such as adipic acid, sebacie acid, phthalic acid, isophthalic acid and naphthalene-2,6-dicarboxylic acid, 5-sodium sulfoisophthalic acid, polycarboxylic acid such as trimelitic acid and pyromelitic acid, and a diol component such as tetramethylene glycol, hexamethylene glycol, diethylene glycol, propylene glycol, neopentyl glycol, polyoxyalkylene glycol, p-xylylene glycol, 1,4-cyclohexanedimethanol and 5-sodiumsulforesorcinol, can be used.

The polymerization degree of such a thermoplastic polyester composition is preferably not less than 0.30 in limiting viscosity $[\eta]$ which is determined by dissolving it in o-chlorophenol. The carboxylic terminal group in the thermoplastic polyester is preferably in the range of 20–100 eq/t, more preferably in the range of 20–70 eq/t. An anti-oxidant may be added as needed.

In the polyester composition according to the present invention, inert particles other than the aluminum oxide particles are preferred to be be used together, in order to further increase the abrasion resistance and the scratch resistance when formed as a film.

The "inert particle" means both an inorganic particle and an organic particle. The primary particle diameter of the inert particles is preferably larger than that of the aluminum oxide particles, and the preferable particle diameter is a diameter of not less than 200 nm and not more than 2000 nm.

As the concrete examples of the inert particles, inorganic oxide particles such as titanium oxide, silicon oxide and zirconium oxide particles, inorganic carbonate particles such as calcium carbonate and barium carbonate particles, inorganic phosphate particles such as calcium phosphate and sodium phosphate particles, inorganic sulfate particles such as barium sulfate and calcium sulfate particles, inorganic composite oxide particles such as kaoline and talc, fluoride particles represented by fluorite, and ordinary inorganic particles such as potassium titanate and aluminium hydride particles, can be listed. Among these particles, titanium oxide, silicon oxide, calcium carbonate and calcium phosphate particles are particularly preferred.

In the inert particles, it is preferred that particles having a diameter of not less than 5 $\mu$m are not present as the particle diameter distribution, in order to prevent excessively large protrusions from being generated. To obtain the particles having such a particle diameter distribution, it is effective to pulverize agglomerated particles by dispersion treatment such as a treatment using a sand mill, or to remove agglomerated particles and excessively large particles by a classification operation. The size of the particles is preferred to be made uniform at the stage of the synthesis of the particles.

Concretely, a method for obtaining calcite-type calcium carbonate particles with a relatively uniform particle diameter by blowing a carbon dioxide gas into a water solution of calcium hydride and removing excessively large particles remaining at a small amount by dispersion and classification, or a method for obtaining vaterite-type calcium carbonate particles by blowing a carbon dioxide gas into an alcohol solution of calcium hydride and removing excessively large particles remaining at a very small amount by filtration, can be employed.

As the examples of the inert organic particles, internal particles due to catalyst residue at the time of synthesis of polyester, low molecular organic compound particles such as calcium terephthalate, barium terephthalate and sodium benzoate particles, carbon black, and organic polymeric particles such as polytetrafluoroethane resin, polystyrene resin, silicone resin and crosslinked polymeric resin particles, can be listed. Among these particles, internal particles and crosslinked polymeric resin particles are preferred, and particularly, organic polymeric resin particles are preferred. Concretely, a copolymer composed of a monovinyl compound (X) having a single aliphatic unsaturated bond in a molecule and a compound (Y) having two or more aliphatic unsaturated bonds in a molecule as a crosslinking agent, or a compound composed of only the latter crosslinking agent (Y) can be employed, but it is not limited by these compounds.

As the examples of the compound (X), an aromatic monovinyl compound such as styrene, α-methyl tyrene, fluorostyrene or vinyl pyridine, a vinyl cyanide compound such as acrylonitrile or methacrylonitrile, an acrylate ester monomer such as butylacrylate, 2-ethylhexylacrylate, methylacrylate, 2-hydroxyethylacrylate, glycidylacrylate or N,N'-dimethylaminoethylacrylate, a methacrylate ester monomer such as butylmethacrylate, 2-ethylhexylmethacrylate, methylmethacrylate, 2-hydroxyethylmethacrylate, glycidylmethacrylate or N,N'-dimethylaminoethylmethacrylate, a monomer or dicarboxylic acid and an acid anhydride of dicarboxylic acid such as acrylic acid, methacrylic acid, maleic acid or itaconic acid, or an amide monomer such as acrylic amide or methacrylic amide can be listed. Among these compounds, styrene, α-methylstyrene and p-methylstyrene are preferred.

As examples of the compound (Y), divinylbenzene, or trimethylolpropanetriacrylate or trimethylolpropanetrimethacrylate, or polyfunctional acrylate or methacrylate such as polyethylene glycol diacrylate, polyethylene glycol dimethacrylate, 1,3-butylene glycol diacrylate, 1,3-butylene glycol dimethacrylate, trimethylolpropanetriacrylate or trimethylolpropanetrimethacrylate can be listed.

Among the above-described compounds, particularly divinylbenzene, butylacrylate, ethylene glycol dimethacrylate or trimethylolpropanetrimethacrylate is preferably used. Two or more kinds of compounds (X) and (Y) may be employed as a mixture.

As examples of the preferable composition for the organic polymeric particles, crosslinked polymeric particles using only divinylbenzene, and crosslinked polymeric particles using styrene-divinylbenzene copolymer, styrene-acrylonitriledivinylbenzene copolymer, styrene-methylmethacrylatedivinylbenzene copolymer, or butylacrylate-divinylbenzene copolymer can be employed. Among these compounds, crosslinked polymeric particles using divinylbenzene, styrene-divinylbenzene copolymer or butylacrylate-divinylbenzene copolymer are preferred from the viewpoint of thermal resistance.

The thermal resistance of the crosslinked polymeric particles is preferably not lower than 380° C. at the determination of the thermal decomposition temperature measured by a thermobalance (10% loss temperature), more preferably not lower than 400° C., and particularly preferably not lower than 410° C. In such a condition, it does not occur that the particles agglomerate when the polyester composition is produced or molten and formed or when a formed product is recycled and thereby the uniformity of the surface of the product and the abrasion resistance thereof deteriorate, and therefore such a condition is preferable. In order to satisfy such a thermal resistance, a high crosslinkage must be achieved by a crosslinking agent of the compound (Y). Although the kind of the crosslinking agent is not particularly limited, divinylbenzene is preferred. The content of the divinylbenzene must be not less than 12% by weight as a pure divinylbenzene relative to the entire monomer component constituting the crosslinked polymeric particles, preferably not less than 35% by weight, more preferably not less than 55% by weight.

The crosslinked polymeric particles preferably have a spherical shape and a uniform distribution in particle size from the viewpoints of good slipping property, uniformity of the surface and transparency. Namely, the volume shape factor is preferably in the range of 0.35–0.52, and further preferably not less than 0.45.

The volume shape factor is defined as follows.

Very thin samples having a thickness of about 0.3 μm are prepared from a biaxially oriented film made using a polymer according to the present invention on the respective cross sections in the longitudinal and transverse directions, using an apparatus for making a very thin film. Then, the respective samples are observed by a transmission type electron microscope and number average diameters of the observed particles in the longitudinal, transverse and thickness directions are determined (the respective diameters are indicated as "a", "b" and "c"). The volume of the particle (V) is defined by the following equation (2) and the maximum diameter of the particle in a plane of projection (D) is defined by the following equation (3).

$$V = (4/3\pi) \cdot a\, b\, c \quad (2)$$

$$D = \max(a, b, c) \quad (3)$$

The volume shape factor "f" is calculated from the "V" and "D" determined from the equations (2) and (3) by the following equation (1).

$$f = V/D^3 \quad (1)$$

The crosslinked polymeric particles made by known processes can be used. As the known processes, for example, there are the following processes due to emulsion polymerization.

(1) soap free polymerization process: i.e., process for polymerizing without an emulsifier or using a very small amount of an emulsifier (2) seed polymerization process for adding polymer particles in a polymerization system prior to emulsion polymerization and thereafter emulsion polymerizing (3) core shell polymerization process for emulsion polymerizing a part of a monomer component and polymerizing the residual monomer in the polymerization system (4) polymerization process by the "Ugelstad" disclosed in JP-A-SHO 54-97582 and JP-A-SHO 54-126288

(5) polymerization process without using an expanding agent in the process (4)

In the above processes, particularly the processes (3) and (4) are preferred because spherical crosslinked polymeric particles having a uniform particle diameter distribution can be obtained by the processes.

The crosslinked polymeric particles preferably have a functional group from the viewpoint of affinity with polyester. Although such a functional group is not particularly restricted, for example, a carboxylic group, a hydroxyl group, a sulfonic group, ester group, and a metal salt of a carboxylic group can be employed. Among these groups, a carboxylic group, a metal salt of a carboxylic group and a hydroxyl group are preferred, and particularly a metal salt of a carboxylic group is preferred.

Although the method for introducing the functional group is not particularly limited, a method for firstly producing particles as the matrix for the high crosslinkage and thereafter introducing the functional group to the surface of the matrix particles is preferred from the viewpoint of the thermal resistance of the particles. For example, in the case of introducing a sodium salt of a carboxylic group, by using styrene-divinylbenzene copolymer as the matrix particles, particles with a high crosslinkage by the divinylbenzene are produced, and thereafter, a carboxylic group is introduced into the surface of the particles by a methacrylic acid. A functional group of —COONa group is introduced by turning the particle production system to the alkali side.

As the process for producing the composition containing both the aluminum oxide particles and the inert particles aforementioned, a process for adding both particles to a polyester reaction system may be employed, and a process for preparing master chips in which each of the particles is added to each polymer, blending the master chips and melting and kneading the mixture may be employed.

As to the method or the timing for adding the inert particles, a known method, for example, a method for adding the particles to a reaction system of polyester in a formation of powder or glycol slurry or a method for kneading the particles into polyester in a formation of powder or a slurry using a low boiling point solvent can be employed. In the case of inorganic inert particles, a method for adding the particles to a reaction system of polyester in a formation of glycol slurry used in the reaction system is preferred, and in the case of organic inert particles, a method for kneading the particles into polyester in a formation of a slurry using a solvent having a low boiling point such as water or powder is preferred. In the addition of the particles, it is further preferred to use a vent-type forming apparatus for deaeration. The case of organic inert particles, for example, crosslinked polymeric particles, will be explained in detail.

A method for adding a slurry of crosslinked polymeric particles with water and/or organic compound having a boiling point of not higher than 200° C. to polyester in a vent-type forming apparatus, removing the water and/or the organic compound with a boiling point of not higher than 200° C. under a heating and pressure reducing condition, and melt kneading is preferred because the particles can be dispersed in a more uniform monodispersion condition. The vent-type forming apparatus is a forming apparatus having at least one vent hole, and for example, it may be an extruding forming apparatus or an injection molding apparatus. At least one of vent holes for removing the water and/or the organic compound with a boiling point of not higher than 200° C. is preferably maintained at a pressure reducing condition. The degree of the pressure reducing condition of the vent hole is preferably maintained at a pressure of not more than 100 Torr, more preferably not more than 50 Torr, further more preferably not more than 30 Torr.

On the other hand, the crosslinked polymeric particles are preferably added to polyester in a formation of a slurry of water and/or organic compound having a boiling point of not higher than 200° C. As examples of the organic compound having a boiling point of not higher than 200° C., an alcohol such as methanol, ethanol or ethylene glycol, a hydrocarbon compound such as benzene or toluene, an ester, a ketone or an amine can be employed, but it is not particularly restricted. As these compounds, water is preferred from the viewpoint of handling ability and removability. Of course, water and/or organic compound is in a formation of a mixture solvent of two or more kinds thereof, and in such a case, water-rich mixture solvent is preferred.

In the slurry of crosslinked polymeric particles, an anionic interfacial active agent such as sodium dodecylbenzene sulfonate or sodium lauryl sulfate, a nonionic interfacial active agent such as polyoxyethylenenonilphenylether or polyethylene glycol monostearate, or a protective agent such as polyvinyl alcohol or carboxylmethylcellulose is preferably contained from the viewpoint of particle dispersion property.

Further, although the concentration of the slurry of crosslinked polymeric particles with water and/or organic compound having a boiling point of not higher than 200° C. is not particularly restricted, the content of the water and/or the organic compound having a boiling point of not higher than 200° C. relative to the polymer is preferably in the range of not less than 2% by weight and not more than 30% by weight, and more preferably in the range of not less than 2% by weight and not more than 20% by weight. Such a condition is preferred because the dispersion property of the particles in the polymer is good and the limiting viscosity of the polymer does not decrease.

Furthermore, two or more kinds of inert particles different from each other may be used together. The total content of the inert particles in the polyester is preferably in the range of 0.001–20% by weight, more preferably in the range of 0.005–10% by weight, and further more preferably in the range of 0.01–5% by weight, from the viewpoint of balance of slipping property, abrasion resistance and scratch resistance when formed as a film.

In the reaction system where internal particles are precipitated by the catalyst residue of a metal or a phosphorus compound at the time of synthesis of polyester, the addition of the aluminum oxide particles according to the present invention enables to synthesizing composite particles having a composite formation. The master polymer thus obtained and containing the composite particles may be blended again with a master polymer containing other inert particles and melt kneaded.

In the thermoplastic polyester composition obtained in the present invention, the resistivity of the polyester in melting condition is preferably in the range of $5 \times 10^6$ to $5 \times 10^9$ $\Omega \cdot cm$ because the property for electrostatic charge casting is improved. Where, the resistivity of the polyester in melting condition is determined as follows.

The resistivity is measured using a melt resistivity measuring apparatus shown in FIG. 2. Polyester 8 to be measured is placed in a container into which a pair of electrodes 9 are inserted. The container is dipped in a heating body 7. The polyester 8 is molten and stored in a $N_2$ gas atmosphere at a temperature of 280° C., and a voltage is applied from a D.C. high voltage generation apparatus 4. The resistivity is determined from the indicated values of an ammeter 5 and a voltmeter 6, the area of the electrode and the distance between the electrodes by the following equation.

$$P = (V \times S)/(I \times D)$$

P: melt resistivity ($\Omega \cdot cm$)
V: applied voltage (V)
S: area of electrode ($cm^2$)
I: measured current (A)
D: distance between electrodes (cm)

The resistivity of the polyester in melting condition depends upon the kind, existence and amount of the metal compound added in the production of polyester. Generally, the greater is the amount of the metal in the molten polyester which is not deactivated by a phosphorus compound, or the smaller is the amount of the metal compound which has precipitated in the polyester as particles, the melt resistivity tends to become lower.

Next, the relationship between the melt resistivity and the metal will be explained with reference to the case of polyethylene terephthalate (PET) obtained by transesterification.

In transesterification, usually, an alkali metal compound, an alkaline earth metal compound, a zinc compound or a manganese compound is used as the reaction catalyst, and a phosphorus compound is added in the stage at which the reaction substantially has finished. The metal compound used as the reaction catalyst is partially deactivated by the phosphorus compound. The reaction product thus obtained is condensation polymerized under a condition of existence of antimony compound, titanium compound or germanium compound which is a catalyst for condensation polymerization to obtain PET. Usually, PET is produced by such a process, and the alkali metal compound, alkaline earth metal compound, zinc compound, manganese compound and phosphorus compound mainly affect the melt resistivity. These metal compounds or phosphorus compound tends to cause the generation of the particles which are insoluble to polyester.

As the metal compounds controlling the melt resistivity of polyester in the present invention, an aliphatic carboxylate of alkaline earth metal compound, zinc, manganese or alkali metal compound which is added in the stage of production of polyester, or a metal compound which is soluble in glycol such as halogenide or alcoholate such as methylate, ethylate or ethylene glycolate can be employed. Concretely, manganese acetate, magnesium acetate, calcium acetate, zinc acetate, lithium acetate, potassium acetate, sodium acetate, magnesium propionate, manganese propionate, potassium propionate, calcium propionate, zinc propionate, magnesium chloride, lithium chloride, manganese bromide, magnesium hydroxide, manganese hydroxide, calcium hydroxide, zinc hydroxide, lithium hydroxide, magnesium glycolate, calcium glycolate, lithium methylate or butylpotassium can be employed. Two or more kinds of these compounds may be together employed. Particularly, a manganese compound and alkali metal compound are preferable for suppressing the precipitation of the particles.

In the transesterification, these metal compounds can be added by the amount of the catalyst before the transesterification and can be added again after the transesterification. In the esterification, it is preferred that the compounds are added after the rate of the reaction of the esterification reaches to preferably not less than 90%, more preferably not less than 95%.

As the phosphorus compound, at least one selected from phosphate, phosphite and ester thereof can be employed. Concretely, phosphate, monomethylphosphate, dimethylphosphate, trimethylphosphate, tributylphosphate, phosphite, trimethylphosphite or tributylphosphite can be employed.

The polyester composition is usually extruded in a form of a sheet, cooled on a casting drum, and after an amorphous sheet is made, the sheet is stretched and heat set to produce a biaxially stretched film. If the resistivity of the polyester in a melting condition is in the range of $5 \times 10^6$ to $5 \times 10^9$ $\Omega \cdot cm$, the contact property between the sheet and the casting drum can be improved by providing an electrode between a die for extrusion and the casting drum for cooling and applying a high voltage to the sheet, thereby increasing the productivity. A plurality of kinds of polymers may be blended in a range which does not injure the object of the present invention, and an organic additive such as oxidation inhibitor, thermal stabilizer, lubricant or ultraviolet absorbent may be added by the volume generally employed.

When a film is formed using the thermoplastic polyester according to the present invention, a composite film is preferred, particularly in a case of a film for a magnetic tape, from the viewpoint of a property that fine protrusions with a height of 10–60 nm can be efficiently formed on a film surface by the aforementioned specified aluminum oxide particles and an electromagnetic conversion property.

The "composite film" means a film having at least two layers in the thickness direction, and includes a film having three or more layers. Further, at least one outermost layer preferably comprises the thermoplastic polyester according to the present invention. If the lamination thickness is too small, the aluminum oxide particles approach too closely to the surface and the particles are likely to fall off, and if the lamination thickness is too large, because the amount of the particles is too small near the surface, it is not effective to improve the abrasion resistance in repeated high-speed running. Therefore, when the thickness of the laminated film is referred to as "t", the thickness and the primary particle diameter "D" of the aluminum oxide particles preferably satisfy the following relationship.

$$0.1D \leq t \leq 100D$$

In a case of using two or more kinds of particles, the mean primary particle diameter of the whole of the particles is referred to as "D", and the "D" and the lamination thickness "t" preferably satisfy the above relationship.

A process for producing such a laminated film will be concretely explained.

First, after polyester pellets are blended at a predetermined rate and dried, the pellets are supplied to extruders for melting the pellets and laminating the molten polymers, the polymers are delivered out from a die with a slit in a form of a sheet, and the sheet is cooled and solidified on the casting roll to make a non-stretched film. The polymers are laminated using two or more extruders and a manifold or a feed block for two or more layers (for example, a feed block having a rectangular laminating portion), a sheet having two or more layers is delivered out from a die, and the sheet is cooled to make a non-stretched film. In this process, it is effective to provide a static mixer and a gear pump in the polymer path. Further, it is effective to control the melting temperature of the extruder for extruding the polymer of the outermost layer to a temperature lower than that for the base layer by 5–10° C.

Next, the non-stretched film is biaxially stretched and biaxially oriented. As the stretching process, a sequential biaxially stretching process and a simultaneous biaxially stretching process can be used. However, a sequential biaxially stretching process for firstly stretching in the longitudinal direction, thereafter stretching in the transverse direction, dividing the longitudinal stretching into three or more stages, and controlling the total longitudinal draw ratio within the range of 3.5 to 6.5 times, is particularly preferred. Although the temperature for the longitudinal stretching varies depending on the kind of polyester and therefore cannot be decided to a specified temperature, usually it is effective to control the temperature of the first stage in the range of 50 to 130° C. and the temperature of the succeeding stages at a temperature higher than the temperature of the first stage. The stretching speed in the longitudinal direction is preferably in the range of 5000 to 50000%/min. Generally, a process for using a stenter is employed for the transverse stretching. The draw ratio is preferably in the range of 3.0 to 5.0 times. The stretching speed in the transverse direction is preferably in the range of 1000 to 20000 %/min, and the temperature thereof is preferably in the range of 80 to 160° C. Next, the stretched film is heat treated. The temperature of the heat treatment is preferably in the range of 170 to 220° C., particularly in the range of 180 to 200° C., and the time is preferably in the range of 0.2 to 20 seconds.

Figure 1A:
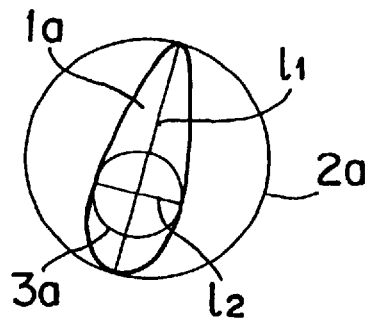
FIGS. 1A, 1B, 1C and 1D are views showing a method for measuring ratios of diameters of circumscribing circles and inscribing circles of respective primary particles.
Figure 1B:
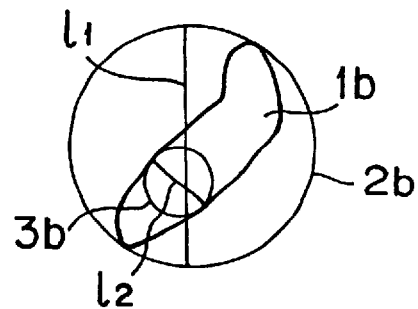
Figure 1C:
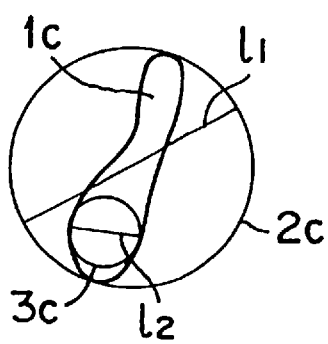
Figure 1D:
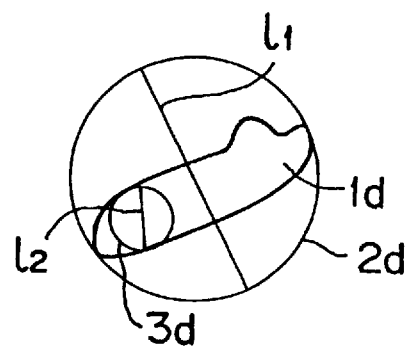
Figure 2:
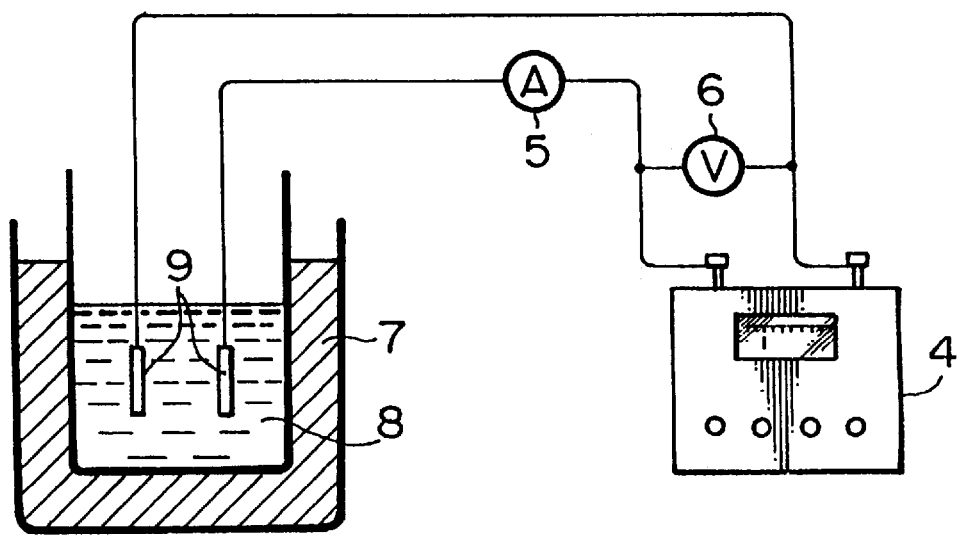
FIG. 2 is a schematic view of an apparatus for measuring the melting specific resistance of the polyester composition used in the present invention.

1a, 1b, 1c, 1d: primary particle
2a, 2b, 2c, 2d: circumscribing circle
3a, 3b, 3c, 3d: inscribing circle
4: DC high voltage generator
5: ammeter
6: voltmeter
7: heater
8: polyester
9: electrode

THE BEST MODE FOR CARRYING OUT THE INVENTION

EXAMPLES

The present invention will be hereunder explained in more detail by examples. The properties of the obtained polyester composition are determined by the following methods.

A. Properties of Particles:

(1) Specific Surface Area (S) and Primary Particle Diameter of Aluminum Oxide Particle:

The specific surface area S ($m^2/g$) is determined by a usual B.E.T method. The primary particle diameter "d" ($\mu m$) is determined by the following equation. In a case using two or more kinds of aluminum oxide particles having specific surface areas different from each other, the weighted mean of the respective primary particle diameters determined by the following equation is defined as the primary particle diameter.

$$d = 6/\rho \cdot S$$

Where,
S: specific surface area ($m^2/g$)
$\rho$: true specific gravity of particle ($g/cm^3$)

(2) Secondary Particle Diameter (Lav) of Aluminum Oxide Particles:

Aluminum oxide particles are contained in a polyester, and after the polyester is formed as a biaxially stretched film, a very thin sample is cut from the film in a direction perpendicular to the thickness direction of the film (0.2 $\mu m$ in the thickness direction), and the sample is observed by a transmission type electron microscope. The magnification is set to 40,000 times, the secondary particles of agglomerated particles are observed by a number of 500–1,000, and the length L ($\mu m$) in a direction parallel to the film surface and the length D ($\mu m$) in a direction perpendicular to the film surface, respectively. The secondary particle diameter means "L" and a secondary particle average diameter means a number average diameter "Lav" which is a number average diameter of the values of the "L". The rate of not more than 0.05 $\mu m$ in a number determined of the values "L" is also determined.

(3) Crystal Structure of Aluminum Oxide Particle:

Aluminum oxide particles are determined by X-ray diffraction. To identify the crystal structure of the aluminum oxide particles in a polymer or a formed body, the aluminum oxide particles taken out from the polymer by dissolving the polymer with a solvent and separating the particles by centrifugation or filtration may be determined in a similar manner. Because the determination by X-ray diffraction is difficult if the polymer adheres to the extracted particles, it is important to repeatedly wash the particles extracted from the polymer with an appropriate solvent capable of dissolving the polymer well and remove the polymer adhered around the particles.

As the values of "$2\theta$" in various crystal structures, the values shown in the following table are used according to the registered numbers in JCPDS (Joint Committee on Powder Diffraction Standards.

| Crystal structure | JCPDS No. |
|---|---|
| α | 10-173 |
| γ | 10-425, 29-63 |
| δ | 4-877, 16-394 |
| ε | 21-10 |
| η | 4-875 |
| θ | 11-517, 23-1009 |
| κ | 4-878 |
| χ | 4-880, 13-373 |

In a case of a mixture of plural crystal structures, firstly, the kinds of the mixed crystal structures are determined by X-ray diffraction, and then, the X-ray diffraction is repeatedly carried out by changing the mixing ratio of the particles with the respective crystal structures to respective specified ratios to prepare respective standards of mixtures, and the mixing ratio of the particles to be measured is determined by comparing with the prepared standards.

(4) Shape of Aluminum Oxide Particle, Rate of Acicular or Platy Particle:

A circle circumscribing a primary particle in a polymer or a formed body observed by a transmission type electron microscope is depicted such that the diameter is minimized, and the diameter of the circumscribing circle is expressed as "$l_1$". A circle inscribing the primary particle is depicted such that the diameter is maxumumized, and the diameter of the inscribing circle is expressed as "$l_2$". The ratio of $l_1/l_2$ is determined.

When secondary agglomerated particles are observed by a transmission type electron microscope, the rate of number of the agglomerated particles, each containing at least one particle with the above ratio of $l_1/l_2$ of not less than 2 and not more than 20 (acicular or platy particle) as a primary particle constituting the agglomerated particle, relative to the total number of agglomerated particles is determined. The values $l_1/l_2$ in the Examples mean average values of such determined ratios of $l_1/l_2$.

(5) Content of Aluminum Oxide Particles:

After the polymer, film or fibers containing aluminum oxide particles are melt reformed, the Al element is determined by usual X-ray fluorescence analysis, and it is converted to the weight of $Al_2O_3$.

B. Properties of Polymer:

(1) Intrinsic Viscosity (IV):

The intrinsic viscosity is determined in o-chlorophenol at a temperature of 25° C. and a concentration of 1% by weight, using an Ostwald viscometer.

(2) Softening Point:

The softening point is determined by a penetrameter, and represented as a value of SP (° C.). In the measurement, a polymer is placed in a heated bath and heated at 6° C. /5 min., and the softening point is determined as a temperature at the time when a tip of a load enters into the polymer.

(3) Concentration of Carboxylic Terminal Group:

It is determined by Maurice's method.

A polymer of 2 g is dissolved into an o-cresol chloroform (weight ratio: 7/3) of 50 ml, and titrated by N/20 NaOH methanol solution, and the concentration of carboxylic terminal group is determined and represented as a value of equivalent weight/polyester of $10^6$ g.

(4) Thermostability:

A polyester is molten in a $N_2$ g as atmosphere at 300° C., the intrinsic viscosities at the time of 8 minutes and 68 minutes after the starting of the melting are measured, and the thermostability is represented as the difference $\Delta IV$. The smaller the $\Delta IV$, the better the thermostability.

(5) Casting Property with Electrostatic Charge:

D.C. voltage of 6 kV is applied on the film melt extruded using an electrode provided between a die and a casting drum, and when the speed of the casting is gradually increased, a casting speed (m/min.) causing an application irregularity is determined. Accordingly, the faster this speed, the better the productivity, and it is preferable.

C. Properties of Film:

(1) Surface Roughness Ra ($\mu$m):

The surface roughness is measured based upon JIS-B-0601, and a center-line mean roughness measured using a Surfcom surface roughness meter under conditions of a diameter of probe of 2 $\mu$m, a load of the probe of 70 mg, a measuring length of 0.25 mm and a cut off of 0.08 mm is employed as the surface roughness Ra. The center-line mean roughness is determined by the following equation when a portion with a measuring length "h" is taken out from a roughness curve in a direction along the center line of the roughness curve, the center line of the taken-out portion is defined as an X-axis, the direction perpendicular to the X-axis is referred to as a Y-axis, and the surface roughness curve is represented as an equation of y=f(x).

$$Ra = (1/h) \int_0^h |f(x)| dx$$

(2) Slipping Property:

A film is slitted to prepare a tape with a width of ½ inch. The tape is set in a tape running tester (TBT-300; produced by Yokohama System Kenkyusyo Corporation) and is run under a condition of 20° C. and 60% RH, and the initial friction coefficients $\mu_k$ is determined by the following equation. Where, the diameter of a guide is 6 mm$\phi$, the material of the guide is SUS27 (surface roughness: 0.2S), the winding angle is 180 degrees and the running speed is 3.3 cm/sec.

$$\mu_k = 0.733 \log (T_1/T_2)$$

$T_1$: exit side tension
$T_2$: entrance side tension

The film having $\mu_k$ of not more than 0.35 is good in slipping property. If $\mu_k$ is greater than 0.35, the slipping property when the film is processed or a product is made from the film extremely deteriorates.

(3) Number of Protrusions with a Height of 10–60 nm on a Skin Surface of a Film:

A film is placed on a sample table, and platinum is deposited on the film surface. The platinum-deposited film is set at an angle of 82.5 degrees, ten fields of the film surface are observed by a scanning type electron microscope at a magnification of 10,000–30,000 times, and the number with a height of 10–60 nm on the surface is calculated.

(4) Abrasion Resistance ①:

A film is slitted to prepare a tape with a width of ½ inch. The tape is set in a tape running tester (TBT-300; produced by Yokohama System Kenkyusyo Corporation) and is run repeatedly by 1000 times under a condition of 20° C. and 60% RH, and thereafter, the abrasion resistance ① is ranked by the amount of chipped white powder generated on the surface of a guide. The diameter of the guide is 8 mm $\phi$, the material of the guide is SUS27 (surface roughness: 0.2S), the winding angle is 180 degrees and the running speed is 3.3 cm/sec. The standards of ranking are as follows.

Rank 1: The amount of the generated white powder is extremely small.
Rank 2: The amount of the generated white powder is small.
Rank 3: The amount of the generated white powder is slightly large.
Rank 4: The amount of the generated white powder is very large.

The smaller the amount of the generated white powder, the better the abrasion resistance.

(5) Abrasion Resistance ②:

A tape applied with a magnetic layer is calendering treated at a temperature of 70° C. and a line pressure of 200 kg/cm by a small-sized test calendering apparatus (five stage type of steel rolls and nylon rolls, the nylon rolls come into contact with the base film surface). After the treatment is carried out over a length of 10000 m, the white powder generated by the treatment and adhered to the nylon rolls is observed, the abrasion resistance ② is ranked as follows. The smaller is the amount of the generated white powder, the better is the abrasion resistance.

Rank 1: There is almost no adherence of white powder.
Rank 2: The amount of adhered white powder is small.
Rank 3: The amount of adhered white powder is slightly large.
Rank 4: The amount of adhered white powder is very large, and it causes troubles on processing and properties of products, and the film cannot be used.

(6) Scratch Resistance (in repeated high-speed running):

A film is slitted to prepare a tape with a width of ½ inch. The tape is set in a tape running tester and is run on a guide pin of SUS304 with a surface roughness Rt of 0.2 $\mu$m and a diameter of 8 mm (running speed: 250 m/min., running length: 100 m, running times: 10 paths, winding angle: 60 degrees). At that time, the scratches generated on the film are observed in the width direction of the film by a microscope by appropriate ten field, and the number of the scratches per one width is determined and ranked as follows.

Rank A: The number of the scratches is in the range of 0–3.
Rank B: The number of the scratches is in the range of 4–10.
Rank C: The number of the scratches is not less than 11.

The fewer the scratches, the better the scratch resistance.

(7) Electromagnetic Conversion Property:

A magnetic coating solution with the following composition is coated on the film by using a gravure roll and the coated magnetic layer is magnetically oriented and dried. After the coated film is calendered by a small-sized test calendering apparatus (steel roll/nylon roll; 5 stages) at a temperature of 70° C. and a line pressure of 200 kg/cm, the film is cured at a temperature of 70° C. for 48 hours. The film is slitted to a tape with a width of ½ inch and a pancake is made from the tape. The tape is incorporated into a VTR cassette from the pancake by a length of 250 m to make a VTR cassette tape. (Composition of magnetic coating solution)(All parts are by weight.)

Co-containing iron oxide: 100 parts
Vinyl chloride/vinyl acetate copolymer: 10 parts
Polyurethane elastomer: 10 parts
Polyisocyanate: 5 parts
Lecitin: 1 part
Methylethylketone: 75 parts
Methylisobutylketone: 75 parts
Toluene: 75 parts
Carbon black: 2 parts
Lauric acid: 1.5 parts 100% chromatic signal generated by a television testing wave generator is recorded in the above tape using a domestic VTR, and chromatic S/N is determined from the regenerated signal using a color video noise measuring apparatus.

Example 1 (Table 1)

Aluminum oxide particles (a) were prepared by calcining an aluminum hydroxide (boehmite) obtained by hydrolysis of an aluminum isopropylalkoxide. The specific surface area of the aluminum oxide particles (a) was 84 m²/g, and when the crystal structure thereof was analyzed by X-ray diffraction, the main structure was θ-type. The θ-type aluminum oxide particles (a) of 10 parts by weight and ethylene glycol of 90 parts by weight were mixed to make a slurry, and the mixture was treated for dispersion using a sand grinder. Then, the slurry was filtered by a filter of glass fibers with an absolute cut size of 3 μm, and an ethylene glycol slurry (b) of θ-type aluminum oxide particles of 100 parts by weight was prepared. The "50% equivalent diameter in conversion to sphere" of agglomerated particles was 0.24 μm.

On the other hand, after dimethyl terephthalate of 100 parts by weight and ethylene glycol of 64 parts by weight, added with magnesium acetate of 0.05 part by weight as a catalyst, were transesterified by a regular method, the previously prepared slurry (b) of 20 parts by weight was added to it at 230° C., and the ethylene glycol was distilled for ten minutes maintaining the temperature of 230° C. Then, antimony oxide of 0.03 part by weight as a catalyst and trimethylphosphate of 0.03 part by weight as a thermal stabilizer were added, pressure reduction was started after ten minutes from the addition, and a condensation polymerization was carried out by a regular method. The temperature at the end of the condensation polymerization was 278° C., and the pressure was 0.1 mmHg. The intrinsic viscosity of the polyethylene terephthalate composition (c) thus obtained was 0.618, the ΔIV was 0.016, the softening point was 259.8° C., and the concentration of carboxylic terminal group was 38 eq/10⁶ g.

Next, calcite-type calcium carbonate particles of 15 parts by weight, ethylene glycol of 83 parts by weight, and poly(acrylic acid/acrylic methylester) copolymer (molecular weight: 4600) of 2 parts by weight as a surface treatment agent for the calcite-type calcium carbonate particles, were mixed, and after the mixture was dispersed and surface treated using a sand grinder, it was classified in a wet system, and thereafter, the slurry was filtered by a polypropylene filter with an absolute cut size of 5 μm. After the filtration, the concentration of the calcium carbonate particles in the ethylene glycol slurry (d) of calcium carbonate particles was 10% by weight, and the "50% equivalent diameter in conversion to sphere" of the particles was 0.51 μm.

On the other hand, after dimethyl terephthalate of 100 parts by weight and ethylene glycol of 64 parts by weight, added with magnesium acetate of 0.05 part by weight as a catalyst, were transesterified by a regular method, the previously prepared slurry (d) of 20 parts by weight was added to it at 230° C., and the ethylene glycol was distilled for ten minutes maintaining the temperature of 230° C. Then, antimony oxide of 0.03 part by weight as a catalyst and trimethylphosphate of 0.03 part by weight as a thermal stabilizer were added, pressure reduction was started after ten minutes from the addition, and a condensation polymerization was carried out by a regular method. The temperature at the end of the condensation polymerization was 278° C., and the pressure was 0.1 mmHg. The intrinsic viscosity of the polyethylene terephthalate composition (e) thus obtained was 0.616, the ΔIV was 0.014, the softening point was 260.2° C., and the concentration of carboxylic terminal group was 36 eq/10⁶ g.

Next, polyethylene terephthalate (f) with an intrinsic viscosity of 0.615, a ΔIV of 0.010, a softening point of 260.1° C. and a concentration of carboxylic terminal group of 26 eq/10⁶ g, which did not contain particles, was used, and the previously prepared polyethylene terephthalate composition (c), (e) and the polyethylene terephthalate (f) were blended in a condition of pellets such that the mixing ratio thereof was 15/15/70 in weight ratio. After the mixture was vacuum dried at a temperature of 140° C. for three hours, it was melt kneaded by a twin-screw extruder at a temperature of 285° C., the molten polymer was delivered out from a die with a slit, and the delivered polymer was cooled on a casting drum to form a amorphous polyethylene terephthalate composition. Thereafter, the composition was stretched at a draw ratio of 3.5 times in longitudinal and transverse directions, respectively, and then it was heat treated at a temperature of 220° C. for five seconds to form a biaxially stretched polyethylene terephthalate film with a thickness of 14 μm.

When the state of the particles present in the film was observed by an electron microscope as aforementioned, the shape of the primary particles of θ-type aluminum oxide particles (a) was $I_1/I_2=5.2$, the diameter of the agglomerated secondary particles was Lav=0.18 μm (D=0.04 μm), and the rate of the number of the agglomerated particles each containing at least one acicular or platy particle relative to the total number of agglomerated particles was 75%. Further, the rate of the particles of L≦0.05 μm was 53%. When the state of the film surface was observed in a manner as aforementioned, the surface roughness Ra was 0.020 μm, and very fine protrusions with a height of not less than 10 nm and not more than 60 nm originating from θ-type aluminum oxide particles (a) were observed to be 1, 300,000/mm² in number. When the properties of the film were estimated, the running ability $\mu_k$ was 0.18, the abrasion resistance ① was rank 1, the abrasion resistance ② was rank 1, and particularly the scratch resistance in repeated high-speed running was rank A, and thus, the properties of the film were excellent.

Examples 2–4 (Table 1)

In Example 1, the rate of the crystal structures in aluminum oxide particles was changed by changing the calcination condition in synthesis of aluminum oxide particles (a), and the kind and particle diameter of inert particles were changed. Other conditions were the same as those of Example 1. Thus, biaxially stretched polyethylene terephthalate films having a thickness of 14 μm were formed. The properties of the films obtained were excellent as shown in Table 1.

Example 5 (Table 2)

Aluminum oxide particles (g) were made by calcining aluminum dorsonite synthesized by neutralization and synthesis of an alum with a carbonate. The specific surface area of the aluminum oxide particles (g) was 99 m²/g, and when the crystal structure of the particles was analyzed by X-ray diffraction, it was θ-type. A biaxially stretched polyethylene terephthalate film having a thickness of 14 μm was formed in the same conditions as those of Example 1 other than use of the above aluminum oxide particles and change of the kind and particle diameter of inert particles. The properties of the film obtained were good as shown in Table 2.

Example 6 (Table 2)

A biaxially stretched polyethylene terephthalate film having a thickness of 14 μm was formed in the same conditions as those of Example 5 other than change of the specific surface area of the above aluminum oxide particles (g) and the kind and particle diameter of inert particles. The properties of the film obtained were good as shown in Table 2.

Examples 7–10 (Table 3)

In Example 1, the rate of the crystal structures in aluminum oxide particles was changed by changing the calcination condition in synthesis of aluminum oxide particles (a), and the kind and particle diameter of inert particles were changed. Other conditions were the same as those of Example 1. Thus, biaxially stretched polyethylene terephthalate films having a thickness of 14 μm were formed. The properties of the films obtained were good as shown in Table 3.

Example 11 (Table 4)

Aluminum oxide particles (h) with a specific surface area of 83 m²/g and 100% θ-type crystal structure in X-ray diffraction and aluminum oxide particles (i) with a specific surface area of 24 m²/g and 100% α-type crystal structure in X-ray diffraction were made in a manner similar to that of Example 1. The aluminum oxide particles (h) of 9.5 parts by weight, the aluminum oxide particles (i) of 0.5 part by weight and ethylene glycol of 90 parts by weight were mixed to form a slurry, and the slurry was dispersion treated using a sand grinder. Thereafter, the slurry was filtered in a manner similar to that of Example 1, and ethylene glycol slurry (j) of θ/α mixture-type aluminum oxide particles of 100 parts by weight was prepared. The "50% equivalent diameter in conversion to sphere" of agglomerated particles was 0.24 μm.

Polyethylene terephthalate composition (k) was prepared in a manner similar to that of Example 1 other than addition of the slurry (j) instead of slurry (b). The intrinsic viscosity of the polyethylene terephthalate composition (k) thus obtained was 0.617, the ΔIV was 0.016, the softening point was 259.9° C. and the concentration of carboxylic terminal group was 36 eq/10⁶ g.

Next, non-dried polyethylene terephthalate pellets with a water content of 0.4% by weight and an intrinsic viscosity of 0.621 were molten using a vent-type twin screw extruder, and a water slurry of polydivinylbenzene particles [divinylbenzene/ethylvinylbenzene (weight ratio: 80/20) copolymer] having a sodium carboxylate as a functional group and having a mean particle diameter of 0.43 μm was added to the polymer so that the final content of the particles was 2.0% by weight. The vent port was maintained to be 10 torr in vacuum degree, and the polymer was melt extruded at a temperature of 280° C. to obtain a polyethylene terephthalate composition (1) containing polydivinylbenzene particles. The intrinsic viscosity of the polyethylene terephthalate composition (1) thus obtained was 0.616, the ΔIV was 0.013, the softening point was 260.0° C. and the concentration of carboxylic terminal group was 28 eq/106 g.

Next, polyethylene terephthalate (f) prepared in Example 1, which did not contain particles, was used, and the previously prepared polyethylene terephthalate composition (k), (1) and the polyethylene terephthalate (f) were blended in a condition of pellets such that the mixing ratio thereof was 15/10/75 in weight ratio. Using this mixture, a biaxially stretched polyethylene terephthalate film having a thickness of 14 μm was formed in a manner similar to that of Example 1.

When the state of the particles present in the film was observed by an electron microscope as aforementioned, the shape of the primary particles of θ/α mixture-type aluminum oxide particles (h, i) was $I_1/I_2$=3.8, the diameter of the agglomerated secondary particles was Lav=0.16 μm (D=0.04 μm), and the rate of the number of the agglomerated particles each containing at least one acicular or platy particle relative to the total number of agglomerated particles was 76%. Further, the rate of the particles of L≦0.05 μm was 46%. When the state of the film surface was observed in a manner as aforementioned, the surface roughness Ra was 0.019 μm, and very fine protrusions with a height of not less than 10nm and not more than 60 nm originating from θ/α mixture-type aluminum oxide particles (h, i) were observed to be 1,220,000/mm² in number. When the properties of the film were estimated, the running ability $\mu_k$ was 0.17, the abrasion resistance ① was rank 1, the abrasion resistance ① was rank 1, and particularly the scratch resistance in repeated high-speed running was rank A, and thus, the properties of the film were excellent. In Table 4, "DVB·EVB" represents a divinylbenzene/ethylvinylbenzene copolymer.

Examples 12, 13 (Table 4)

In Example 1, the rate of the crystal structures in aluminum oxide particles was changed by changing the calcination condition in synthesis of aluminum oxide particles (a), and the kind and particle diameter of inert particles were changed. Other conditions were the same as those of Example 1. Thus, biaxially stretched polyethylene terephthalate films having a thickness of 14 μm were formed. The properties of the films obtained were good as shown in Table 4.

Examples 14–16 (Table 5)

Biaxially stretched polyethylene terephthalate films having a thickness of 14 μm were formed in the same conditions as those of Example 11 other than change of the mixing ratio of the aluminum oxide particles (h) and the aluminum oxide particles (i) and the kind and particle diameter of inert particles. The properties of the films obtained were good as shown in Table 5.

Example 17 (Table 6)

A slurry prepared by kneading terephthalic acid of 86.5 parts by weight and ethylene glycol of 37.1 parts by weight (mole ratio: 1.15) was continuously supplied for 3.5 hours to an esterification reactor in which a molten reaction intermediate product (bishydroxyethylterephthalate) of 110 parts by weight prepared from ethylene glycol/terephthalic acid (mole ratio: 1.15) was stored. The temperature of the reaction system was maintained at 250° C. from the beginning of the supply, and the water generated due to the esterification reaction was distilled from the top of a fractionating column. A bishydroxyethylterephthalate with a reaction ratio of 98.0% was obtained by continuing the esterification reaction of the slurry. After the bishydroxytethylterephthalate of 104.8 parts by weight (corresponding to polyethylene terephthalate of 100 parts by weight) was transferred to a condensation polymerization reactor, lithium acetate of 0.25 part by weight was added, and after maintaining the condition at 250° C. for ten minutes, the slurry of aluminum oxide particles used in Example 10 was added by 5 parts by weight. Then, calcium acetate of 0.13 part by weight and antimony trioxide of 0.03 part by weight were added. After maintaining the condition at 250° C. for ten minutes, trimethylphosphate of 0.20 part by weight and phosphorous acid of 0.02 part by weight were added. Thereafter, condensation polymerization was carried out in a regular manner, and a polyethylene terephthalate (m) containing particles, in which internal particles having a structure of Ca-Li-P of 0.8% by weight (mean particle diameter: 1.6 μm) and θ/α mixture-type aluminum oxide particles were mixed and dispersed, was obtained. The intrinsic viscosity of this polymer was 0.616, the ΔIV was 0.013, the softening point was 261.2° C. and the concentration of carboxylic terminal group was 31 eq/$10^6$ g.

Next, polyethylene terephthalate composition (1) prepared in Example 11 and the polyethylene terephthalate composition (m) prepared in the above were blended in a condition of pellets such that the mixing ratio of (1)/(m) was 5/95 in weight ratio. Using this mixture, a biaxially stretched polyethylene terephthalate film having a thickness of 14 μm was formed in a manner similar to that of Example 1.

When the state of the particles present in the film was observed by an electron microscope as aforementioned, the shape of the primary particles of θ/α mixture-type aluminum oxide particles was $I_1/I_2$=5.1, the diameter of the agglomerated secondary particles was Lav=0.16 μm (D=0.04 μm), and the rate of the number of the agglomerated particles each containing at least one acicular or platy particle relative to the total number of agglomerated particles was 87%. Further, the rate of the particles of L≦0.05 μm was 28%.

When the state of the film surface was observed in a manner as aforementioned, the surface roughness Ra was 0.023 μm, and very fine protrusions with a height of not less than 10 nm and not more than 60 nm originating from θ/α mixture-type aluminum oxide particles (a) were observed to be 1,100,000/mm² in number. When the properties of the film were estimated, the running ability $\mu_k$ was 0.16, the abrasion resistance ① was rank 1, the abrasion resistance ② was rank 1, and particularly the scratch resistance in repeated high-speed running was rank A, and thus, the properties of the film were excellent.

Examples 18, 19 (Table 6)

Biaxially stretched polyethylene terephthalate films having a thickness of 14 μm were formed under the same conditions as those of Example 10 other than use of aluminum oxide particles having two or more kinds of crystal structures prepared by changing the calcination condition in synthesis of the aluminum oxide particles (a) in Example 1. Although the properties of the films obtained were good as shown in Table 6, the scratch resistance in repeated high-speed running and the abrasion resistances ① and ② were slightly poor as compared with those of Example 10.

Example 20 (Table 7)

Aluminum oxide particles (n) were made by calcining aluminum hydride (Bayerite) prepared from a metal aluminium as a main raw material. The specific surface area of the aluminum oxide particles (n) was 42 m²/g, and when the crystal structure of the particles was analyzed by X-ray diffraction, it was a mixture type of θ-type and η-type. α-type was not included. A biaxially stretched polyethylene terephthalate film having a thickness of 14 μm was formed in the same conditions as those of Example 11 other than use of the above aluminum oxide particles (n). Although the properties of the films obtained were good as shown in Table 7, scratch resistance in repeated high-speed running and the abrasion resistance ② were slightly poor as compared with those of Example 11.

Examples 21, 22 (Table 7)

In Example 1, the rate of the crystal structures in aluminum oxide particles was changed by changing the calcination condition in synthesis of aluminum oxide particles (a), and the kind and particle diameter of inert particles were changed. Other conditions were the same as those of Example 1. Thus, biaxially stretched polyethylene terephthalate films having a thickness of 14 μm were formed. The properties of the films obtained were good as shown in Table 7.

Example 23 (Table 8)

Polyethylene terephthalate composition containing θ+α type aluminum oxide particles used in Example 10 and polyethylene terephthalate compositions (e) and (f) used in Example 1 were blended so that the mixing ratio was 15/30/55 in weight ratio, the mixture was dried in a reduced pressure condition (3 torr) at 180° C. for three hours, and the mixture was supplied to a vent-type twin-screw extruder No.1 and molten at 280° C. (polymer I). Further, only the polyethylene terephthalate composition (f) was dried in a reduced pressure condition (3 torr) at 180° C. for three hours, and the composition (f) was supplied to another twin-screw extruder No. 2 and molten at 290° C. (polymer II). After these two polymers were filtered at high accuracy filtration degrees, respectively, the polymers were laminated using a three-layer feed block with a rectangular lamination portion such that the polymer II was placed as a base layer and the polymer I was placed as both surface portions. The laminated polymer was delivered out from a fish-tail type die in a form of a sheet, and the delivered sheet was cooled and solidified on a casting drum using an electrostatic casting method to form a non-stretched film having a thickness of about 160 μm. At that time, the draft ratio was 6.5.

The non-stretched film was stretched in the longitudinal direction at three stretching stages wherein the first stage was at 123° C. and 1.2 times, the second stage was at 126° C. and 1.45 times and the third stage was at 114° C. and 2.3 times. The uniaxially stretched film obtained was stretched in the transverse direction at two stretching stages of a first stage at 111° C. and 3.7 times and a second stage at 113° C. and 1.2 times using a stenter, and the film was then heat treated under a condition of a constant length at 200° C. for five seconds to make a film having a thickness of 14 μm. The thickness of the outermost layer "t" of the film obtained was 1.0 μm, and the relationship between the thickness "t" and the mean diameter "d" (=0.51 μm) of calcite-type calcium carbonate particles was t=1.96d.

The properties of the film are shown in Table 8. The abrasion resistances ① and ② and the scratch resistance in repeated high-speed running were all good similarly in Example 10. Further, when the electromagnetic conversion property was estimated, it was +2.0 dB when the data of Example 10 was set as the standard, and it was very good film.

Examples 24, 25 (Table 8), Examples 26–28 (Table 9)

Biaxially stretched polyethylene terephthalate films having a thickness of 14 μm were formed in the same manner as that of Example 23 other than changing of the crystal structure and content of aluminum oxide particles, the kind and particle diameter of inert particles and the thickness of lamination. The properties of the films obtained are shown in Tables 8 and 9, and not only the abrasion resistance and the scratch resistance in repeated high-speed running but also the electromagnetic conversion property were good.

Comparative Example 1 (Table 10)

Aluminum oxide particles (o) were obtained by sublimation of aluminum chloride and flame hydrolysis thereof in a gaseous phase of hydrogen and oxygen atmosphere. The specific surface area of the aluminum oxide particles (o) was 97 m²/g, and when the crystal structure of the particles was analyzed by X-ray diffraction, it was 100% δ-type. A biaxially stretched polyethylene terephthalate film having a thickness of 14 μm was formed in the same conditions as those of Example 1 other than use of the above aluminum oxide particles (o). The properties of the film obtained are shown in Table 10, and the scratch resistance in repeated high-speed running was not in a satisfactory level.

Comparative Examples 2–4 (Table 10)

Biaxially stretched polyethylene terephthalate films having a thickness of 14 μm were formed in the same manner as that of Comparative Example 1 other than change of the crystal structure of aluminum oxide particles by changing the synthesis method, and change of the kind and particle diameter of inert particles. The properties of the films obtained are shown in Table 10, and the abrasion resistance and the scratch resistance in repeated high-speed running were insufficient.

Comparative Examples 5, 6 (Table 11)

Biaxially stretched polyethylene terephthalate films having a thickness of 14 μm were formed in the same manner as that of Example 1 other than use of oxide particles with a large specific surface area instead of aluminum oxide particles. The properties of the films obtained are shown in Table 11, and the abrasion resistance and the scratch resistance in repeated high-speed running were all poor.

Comparative Examples 7, 8 (Table 12)

Biaxially stretched polyethylene terephthalate films having a thickness of 14 μm were formed in the same manner as that of example 23 other than change of the crystal structure of aluminum oxide particles. The properties of the films obtained are shown table 12, and the abrasion resistance and the scratch resistance in repeated high-speed running were insufficient. Further, the electromagnetic conversion property was not improved as compared with that in Example 10.

TABLE 1

| | Example 1 | Example 2 | Example 3 | Example 4 |
|---|---|---|---|---|
| [Aluminum oxide particle] | | | | |
| Specific surface area (m²/g) | 84 | 81 | 81 | 83 |
| Primary particle diameter (nm) | 33 | 33 | 34 | 32 |
| Crystal structure | θ | θ | θ | θ |
| Mixing ratio (%) | 100 | 100 | 100 | 100 |
| Content (wt %) | 0.3 | 0.3 | 0.4 | 0.4 |
| $l_1/l_2$ | 5.2 | 3.6 | 2.7 | 2.5 |
| Lav (μm) | 0.18 | 0.18 | 0.20 | 0.20 |
| D/L | 0.22 | 0.24 | 0.23 | 0.24 |
| Rate of acicular or platy particles (%) | 75 | 61 | 43 | 43 |
| Rate of particles with a diameter of not more than 0.05 μm (%) | 53 | 55 | 45 | 43 |
| [Inert particle] | | | | |
| Kind | Calcite-type calcium carbonate | Calcite-type calcium carbonate | Vaterite-type calcium carbonate | Silica |
| Mean diameter (μm) | 0.51 | 0.57 | 0.49 | 0.55 |
| Content (wt %) | 0.3 | 0.3 | 0.4 | 0.3 |
| [Film] | | | | |
| Ra (μm) | 0.020 | 0.020 | 0.020 | 0.021 |
| Number of protrusions with 10–60 nm (number/mm²) | 130 × 10⁴ | 115 × 10⁴ | 95 × 10⁴ | 90 × 10⁴ |
| Running ability μk | 0.18 | 0.18 | 0.18 | 0.18 |
| Abrasion resistance ① | 1 | 1 | 1 | 2 |
| Abrasion resistance ② | 1 | 2 | 2 | 2 |
| Scratch resistance in repeated high-speed running | A | A | B | B |

TABLE 2

| | Example 5 | Example 6 |
|---|---|---|
| [Aluminum oxide particle] | | |
| Specific surface area (m²/g) | 99 | 102 |
| Primary particle diameter (nm) | 15 | 15 |
| Crystal structure | θ | θ |
| Mixing ratio (%) | 100 | 100 |
| Content (wt %) | 0.3 | 0.3 |
| $l_1/l_2$ | 1.8 | 1.6 |
| Lav (μm) | 0.23 | 0.22 |
| D/L | 0.57 | 0.57 |
| Rate of acicular or platy particles (%) | 23 | 21 |
| Rate of particles with a diameter of not more than 0.05 μm (%) | 45 | 42 |
| [Inert particle] | | |
| Kind | Calcite-type calcium carbonate | Vaterite-type calcium carbonate |
| Mean diameter (μm) | 0.62 | 0.47 |
| Content (wt %) | 0.3 | 0.3 |
| [Film] | | |
| Ra (μm) | 0.019 | 0.018 |
| Number of protrusions with 10–60 nm (number/mm²) | 60 × 10⁴ | 60 × 10⁴ |
| Running ability μk | 0.18 | 0.18 |
| Abrasion resistance ① | 3 | 3 |
| Abrasion resistance ② | 3 | 3 |
| Scratch resistance in repeated high-speed running | B | B |

TABLE 3

| | Example 7 | Example 8 | Example 9 | Example 10 |
|---|---|---|---|---|
| [Aluminum oxide particle] | | | | |
| Specific surface area ($m^2/g$) | 77 | 85 | 83 | 76 |
| Primary particle diameter (nm) | 35 | 32 | 32 | 35 |
| Crystal structure | θ | θ | θ | θ + α |
| Mixing ratio (%) | 100 | 100 | 100 | 97.4/2.6 |
| Content (wt %) | 0.3 | 0.4 | 0.4 | 0.3 |
| $l_1/l_2$ | 2.1 | 2.3 | 2.2 | 5.1 |
| Lav (μm) | 0.21 | 0.18 | 0.21 | 0.13 |
| D/L | 0.21 | 0.23 | 0.23 | 0.23 |
| Rate of acicular or platy particles (%) | 45 | 43 | 48 | 87 |
| Rate of particles with a diameter of not more than 0.05 μm (%) | 43 | 47 | 42 | 52 |
| [Inert particle] | | | | |
| Kind | DVB.EVB (8:2-COONa modified) | Calcite-type calcium carbonate | Silica | Calcite-type calcium carbonate |
| Mean diameter (μm) | 0.51 | 0.63 | 0.55 | 0.51 |
| Content (wt %) | 0.2 | 0.3 | 0.2 | 0.3 |
| [Film] | | | | |
| Ra (μm) | 0.020 | 0.021 | 0.018 | 0.018 |
| Number of protrusions with 10–60 nm (number/$mm^2$) | 75 × $10^4$ | 80 × $10^4$ | 80 × $10^4$ | 135 × $10^4$ |
| Running ability μk | 0.17 | 0.18 | 0.18 | 0.18 |
| Abrasion resistance ① | 2 | 2 | 2 | 1 |
| Abrasion resistance ② | 3 | 3 | 3 | 1 |
| Scratch resistance in repeated high-speed running | B | B | B | A |

TABLE 4

| | Example 11 | Example 12 | Example 13 |
|---|---|---|---|
| [Aluminum oxide particle] | | | |
| Specific surface area ($m^2/g$) | 83 + 24 | 68 | 61 |
| Primary particle diameter (nm) | 36 (32 + 110) | 38 | 42 |
| Crystal structure | θ + α | θ + α | θ + α |
| Mixing ratio (%) | 95.0/5.0 | 95.2/4.8 | 93.3/6.7 |
| Content (wt %) | 0.3 | 0.3 | 0.5 |
| $l_1/l_2$ | 3.8 | 3.3 | 3.1 |
| Lav (μm) | 0.16 | 0.14 | 0.17 |
| D/L | 0.27 | 0.25 | 0.25 |
| Rate of acicular or platy particles (%) | 76 | 79 | 72 |
| Rate of particles with a diameter of not more than 0.05 μm (%) | 46 | 48 | 40 |
| [Inert particle] | | | |
| Kind | DVB.EVB (8:2-COONa modified) | Vaterite-type calcium carbonate | Calcite-type calcium carbonate/silica |
| Mean diameter (μm) | 0.43 | 0.47 | 0.62/0.43 |
| Content (wt %) | 0.20 | 0.3 | 0.3/0.05 |
| [Film] | | | |
| Ra (μm) | 0.019 | 0.019 | 0.020 |
| Number of protrusions with 10–60 nm (number/$mm^2$) | 122 × $10^4$ | 130 × $10^4$ | 130 × $10^4$ |
| Running ability μk | 0.17 | 0.18 | 0.17 |
| Abrasion resistance ① | 1 | 1 | 1 |
| Abrasion resistance ② | 1 | 1 | 1 |
| Scratch resistance in repeated high-speed running | A | A | A |

TABLE 5

| | Example 14 | Example 15 | Example 16 |
|---|---|---|---|
| [Aluminum oxide particle] | | | |
| Specific surface area ($m^2/g$) | 83 + 24 | 83 + 24 | 83 + 24 |
| Primary particle diameter (nm) | 40 (32 + 110) | 43 (32 + 110) | 46 (32 + 110) |
| Crystal structure | θ + α | θ + α | θ + α |
| Mixing ratio (%) | 90.0/10.0 | 86.5/13.5 | 82.5/17.5 |
| Content (wt %) | 0.4 | 0.4 | 0.3 |
| $l_1/l_2$ | 2.5 | 2.5 | 2.8 |
| Lav (μm) | 0.15 | 0.18 | 0.18 |
| D/L | 0.31 | 0.30 | 0.30 |
| Rate of acicular or platy particles (%) | 76 | 74 | 72 |
| Rate of particles with a diameter of not more than 0.05 μm (%) | 39 | 34 | 31 |
| [Inert particle] | | | |
| Kind | Calcite-type calcium carbonate | Calcite-type calcium carbonate/silica | Calcite-type calcium carbonate/DVB.EVB (6:4-COONa modified) |
| Mean diameter (μm) | 0.53 | 0.56/0.40 | 0.55/0.42 |
| Content (wt %) | 0.25 | 0.25/0.05 | 0.2/0.1 |
| [Film] | | | |
| Ra (μm) | 0.018 | 0.021 | 0.021 |
| Number of protrusions with 10–60 nm (number/$mm^2$) | 115 × $10^4$ | 106 × $10^4$ | 100 × $10^4$ |
| Running ability μk | 0.18 | 0.17 | 0.16 |
| Abrasion resistance ① | 1 | 1 | 1 |
| Abrasion resistance ② | 1 | 2 | 1 |
| Scratch resistance in repeated high-speed running | A | A | A |

TABLE 6

| | Example 17 | Example 18 | Example 19 |
|---|---|---|---|
| [Aluminum oxide particle] | | | |
| Specific surface area ($m^2/g$) | 76 | 95 | 120 |
| Primary particle diameter (nm) | 35 | 22 | 18 |
| Crystal structure | θ + α | θ + δ + γ | δ + α |
| Mixing ratio (%) | 97.4/2.6 | 40/30/30 | 40/60 |
| Content (wt %) | 0.5 | 0.3 | 0.3 |
| $l_1/l_2$ | 5.1 | 6.9 | 7.8 |
| Lav (μm) | 0.16 | 0.22 | 0.22 |
| D/L | 0.25 | 0.21 | 0.21 |
| Rate of acicular or platy particles (%) | 87 | 72 | 75 |

TABLE 6-continued

| | Example 17 | Example 18 | Example 19 |
|---|---|---|---|
| Rate of particles with a diameter of not more than 0.05 $\mu$m (%) | 28 | 25 | 22 |
| [Inert particle] | | | |
| Kind | Ca—Li—P system internal particle/ DVB.EVB (8:2-COONa modified) | Calcite-type calcium carbonate | Calcite-type calcium carbonate |
| Mean diameter ($\mu$m) | 1.6/0.43 | 0.51 | 0.51 |
| Content (wt %) | 0.8/0.1 | 0.3 | 0.3 |
| [Film] | | | |
| Ra ($\mu$m) | 0.023 | 0.018 | 0.018 |
| Number of protrusions with 10–60 nm (number/mm$^2$) | 110 × 10$^4$ | 60 × 10$^4$ | 55 × 10$^4$ |
| Running ability $\mu$k | 0.16 | 0.18 | 0.18 |
| Abrasion resistance ① | 1 | 2 | 2 |
| Abrasion resistance ② | 1 | 2 | 2 |
| Scratch resistance in repeated high-speed running | A | B | B |

TABLE 7

| | Example 20 | Example 21 | Example 22 |
|---|---|---|---|
| [Aluminum oxide particle] | | | |
| Specific surface area (m$^2$/g) | 42 | 73 | 113 |
| Primary particle diameter (nm) | 53 | 33 | 16 |
| Crystal structure | θ + η | θ + α | δ + γ |
| Mixing ratio (%) | 60/40 | 97.2/2.8 | 50/50 |
| Content (wt %) | 0.4 | 0.3 | 0.3 |
| $l_1/l_2$ | 1.6 | 2.5 | 2.2 |
| Lav ($\mu$m) | 0.31 | 0.18 | 0.16 |
| D/L | 0.53 | 0.28 | 0.30 |
| Rate of acicular or platy particles (%) | 46 | 42 | 28 |
| Rate of particles with a diameter of not more than 0.05 $\mu$m (%) | 28 | 16 | 65 |
| [Inert particle] | | | |
| Kind | DVB.EVB (8:2-COONa modified) | Silica | Calcium phosphate |
| Mean diameter ($\mu$m) | 0.43 | 0.45 | 0.48 |
| Content (wt %) | 0.20 | 0.4 | 0.4 |
| [Film] | | | |
| Ra ($\mu$m) | 0.020 | 0.021 | 0.020 |
| Number of protrusions with 10–60 nm (number/mm$^2$) | 60 × 10$^4$ | 50 × 10$^4$ | 50 × 10$^4$ |
| Running ability $\mu$k | 0.18 | 0.18 | 0.18 |
| Abrasion resistance ① | 1 | 3 | 3 |
| Abrasion resistance ② | 2 | 3 | 3 |
| Scratch resistance in repeated high-speed running | B | B | B |

TABLE 8

| | Example 23 | Example 24 | Example 25 |
|---|---|---|---|
| [Aluminum oxide particle] | | | |
| Specific surface area (m$^2$/g) | 76 | 80 | 84 + 24 |
| Primary particle diameter (nm) | 35 | 33 | 33 (31 + 110) |
| Crystal structure | θ + α | θ + α | θ + α |
| Mixing ratio (%) | 97.4/2.6 | 98.8/1.2 | 97.0/3.0 |
| Content (wt %) | 0.3 | 0.4 | 0.4 |
| $l_1/l_2$ | 5.1 | 6.0 | 4.8 |
| Lav ($\mu$m) | 0.13 | 0.14 | 0.13 |
| D/L | 0.22 | 0.23 | 0.31 |
| Rate of acicular or platy particles (%) | 87 | 85 | 78 |
| Rate of particles with a diameter of not more than 0.05 $\mu$m (%) | 52 | 48 | 44 |
| [Inert particle] | | | |
| Kind | Calcite-type calcium carbonate | DVB.EVB (6:4-COONa modified) | Calcite-type calcium carbonate/ Silica |
| Mean diameter ($\mu$m) | 0.51 | 0.45 | 0.53/0.50 |
| Content (wt %) | 0.6 | 0.3 | 0.5/0.1 |
| [Film] | | | |
| Delamination thickness ($\mu$m) | 1.0 | 1.0 | 0.8 |
| Ra ($\mu$m) | 0.019 | 0.020 | 0.021 |
| Number of protrusions with 10–60 nm (number/mm$^2$) | 140 × 10$^4$ | 145 × 10$^4$ | 130 × 10$^4$ |
| Running ability $\mu$k | 0.18 | 0.17 | 0.18 |
| Abrasion resistance ① | 1 | 1 | 1 |
| Abrasion resistance ② | 1 | 1 | 2 |
| Scratch resistance in repeated high-speed running | A | A | A |
| Electromagnetic conversion property (dB) [standard: Example 1] | +2.0 | +2.2 | +1.8 |

TABLE 9

| | Example 26 | Example 27 | Example 28 |
|---|---|---|---|
| [Aluminum oxide particle] | | | |
| Specific surface area (m$^2$/g) | 73 | 69 | 52 |
| Primary particle diameter (nm) | 37 | 38 | 55 |
| Crystal structure | θ + α | θ + α | θ + η |
| Mixing ratio (%) | 96.9/3.1 | 95.0/5.0 | 70/30 |
| Content (wt %) | 0.4 | 0.3 | 0.3 |
| $l_1/l_2$ | 5.2 | 3.5 | 2.8 |
| Lav ($\mu$m) | 0.14 | 0.14 | 0.32 |
| D/L | 0.23 | 0.23 | 0.55 |
| Rate of acicular or platy particles (%) | 80 | 76 | 70 |
| Rate of particles with a diameter of not more than 0.05 $\mu$m (%) | 45 | 45 | 26 |

TABLE 9-continued

| | Example 26 | Example 27 | Example 28 |
|---|---|---|---|
| [Inert particle] | | | |
| Kind | Calcite-type calcium carbonate/ EVB.DVB (8:2-COONa modified) | Titanium oxide/ Calcite-type calcium carbonate | Vaterite-type calcium carbonate |
| Mean diameter (μm) | 0.53/0.42 | 0.32/0.48 | 0.50 |
| Content (wt %) | 0.5/0.05 | 0.3/0.3 | 0.6 |
| [Film] | | | |
| Damination thickness (μm) | 0.8 | 1.2 | 1.5 |
| Ra (μm) | 0.020 | 0.021 | 0.022 |
| Number of protrusions with 10–60 nm (number/mm$^2$) | 150 × 10$^4$ | 125 × 10$^4$ | 70 × 10$^4$ |
| Running ability μk | 0.16 | 0.18 | 0.17 |
| Abrasion resistance ① | 1 | 1 | 1 |
| Abrasion resistance ② | 1 | 1 | 2 |
| Scratch resistance in repeated high-speed running | A | A | B |
| Electromagnetic conversion property (dB) [standard: Example 1] | +2.3 | +2.0 | +2.1 |

TABLE 11

| | Comparative Example 5 | Comparative Example 6 |
|---|---|---|
| [Kind of oxide particle] | Silica | Titanium oxide |
| Specific surface area (m$^2$/g) | 210 | 150 |
| Content (wt %) | 0.4 | 0.4 |
| Lav (μm) | 0.42 | 0.38 |
| Rate of particles with a diameter of not more than 0.05 μm (%) | 28 | 35 |
| [Inert particle] | | |
| Kind | Calcite-type calcium carbonate | Calcite-type calcium carbonate |
| Mean diameter (μm) | 0.51 | 0.51 |
| Cotent (wt %) | 0.3 | 0.3 |
| [Film] | | |
| Ra (μm) | 0.026 | 0.024 |
| Number of protrusions with 10–60 nm (number/mm$^2$) | 5 × 10$^4$ | 5 × 10$^4$ |
| Running ability μk | 0.18 | 0.19 |
| Abrasion resistance ① | 4 | 4 |
| Abrasion resistance ② | 4 | 4 |
| Scratch resistance in repeated high-speed running | D | D |

TABLE 10

| | Comparative Example 1 | Comparative Example 2 | Comparative Example 3 | Comparative Example 4 |
|---|---|---|---|---|
| [Aluminum oxide particle] | | | | |
| Specific surface area (m$^2$/g) | 97 | 138 | 72 | 8 |
| Primary particle diameter (nm) | 13 | 15 | 43 | 310 |
| Crystal structure | δ | γ | η | α |
| Mixing ratio (%) | 100 | 100 | 100 | 100 |
| Content (wt %) | 0.3 | 0.4 | 0.5 | 0.4 |
| $l_1/l_2$ | 1.2 | 1.3 | 1.2 | 1.3 |
| Lav (μm) | 0.16 | 0.35 | 0.51 | 0.61 |
| D/L | 0.18 | 0.18 | 0.63 | 0.52 |
| Rate of acicular or platy particles (%) | 3 | 5 | 3 | 0 |
| Rate of particles with a diameter of not more than 0.05 μm (%) | 55 | 32 | 18 | 5 |
| [Inert particle] | | | | |
| Kind | Calcite-type calcium carbonate | Silica | DVB.EVB (5:5-COONa modified) | Calcite-type calcium carbonate/ Silica |
| Mean diameter (μm) | 0.51 | 0.46 | 0.56 | 0.58/0.43 |
| Content (wt %) | 0.3 | 0.3 | 0.3 | 0.2/0.1 |
| [Film] | | | | |
| Ra (μm) | 0.018 | 0.019 | 0.024 | 0.028 |
| Number of protrusions with 10–60 mm (number/mm$^2$) | 30 × 10$^4$ | 15 × 10$^4$ | 10 × 10$^4$ | 1 × 10$^2$ |
| Running ability μk | 0.18 | 0.17 | 0.16 | 0.15 |
| Abrasion resistance ① | 2 | 3 | 4 | 3 |
| Abrasion resistance ② | 2 | 3 | 3 | 4 |
| Scratch resistance in repeated high-speed running | C | C | C | D |

TABLE 12

|  | Comparative Example 7 | Comparative Example 8 |
|---|---|---|
| [Aluminum oxide particle] | | |
| Specific surface (m²/g) | 145 | 105 |
| Primary particle diameter (nm) | 15 | 14 |
| Crystal structure | γ | δ |
| Mixing ratio (%) | 100 | 100 |
| Content (wt %) | 0.3 | 0.3 |
| $l_1/l_2$ | 1.2 | 1.3 |
| Lav (μm) | 0.37 | 0.19 |
| D/L | 0.18 | 0.18 |
| Rate of acicular or platy particles (%) | 5 | 5 |
| Rate of particles with a diameter of not more than 0.05 μm (%) | 35 | 45 |
| [Inert particle] | | |
| Kind | Calcite-type calcium carbonate | Calcite-type calcium carbonate |
| Mean diameter (μm) | 0.51 | 0.51 |
| Content (wt %) | 0.6 | 0.6 |
| [Film] | | |
| Damination thickness (μm) | 1.0 | 0.0 |
| Ra (μm) | 0.022 | 0.021 |
| Number of protrusions with 10–60 nm (number/mm²) | 20 × 10⁴ | 35 × 10⁴ |
| Running ability μk | 0.18 | 0.17 |
| Abrasion resistance ① | 3 | 2 |
| Abrasion resistance ② | 3 | 2 |
| Scratch resistance in repeated high-speed running | C | C |
| Electromagnetic conversion property (dB) [standard: Example 1] | ±0 | −0.2 |

INDUSTRIAL APPLICATIONS OF THE INVENTION

In the thermoplastic polyester composition according to the present invention, particularly, the films formed from the compositions can have excellent slipping property, abrasion resistance and scratch resistance, especially excellent scratch resistance in repeated high-speed running. Therefore, the thermoplastic polyester composition according to the present invention can be applied to various industrial fields requiring these properties, and particularly it is useful as a base film of magnetic recording media.

What is claimed is:

1. A thermoplastic polyester lamination structure comprising 1) at least one layer of a thermoplastic polyester (A) prepared from i) an acid component mainly comprising an aromatic dicarboxylic acid and a glycol component mainly comprising an aliphatic glycol and ii) θ-type aluminum oxide particles (B) and 2) at least one layer of another thermoplastic polyester laminated to said layer of a thermoplastic polyester (A).

2. A thermoplastic polyester lamination structure comprising 1) at least one layer of a thermoplastic polyester (A) prepared from i) an acid component mainly comprising an aromatic dicarboxylic acid, a glycol component mainly comprising an aliphatic glycol and ii) a mixture (C) of two or more kinds of aluminum oxide particles different from each other in crystal structure and 2) at least one layer of another thermoplastic polyester laminated to said layer of a thermoplastic polyester (A).

3. The thermoplastic polyester lamination structure according to claims 2 or 19, wherein at least one kind of particles in said mixture are aluminum oxide particles selected from the group consisting of θ-type, η-type, κ-type and 102-type aluminum oxide particles.

4. The thermoplastic polyester lamination structure according to any of claims 1, 14, 15 or 17, wherein the primary particle diameter of said aluminum oxide particles (B) is not less than 3 nm and not more than 200 nm.

5. The thermoplastic polyester lamination structure according to any of claims 1, 14, 15 or 17, wherein said aluminum oxide particles (B) are synthesized by calcining an aluminum hydroxide prepared from a raw material of an aluminum alkoxide by hydrolysis.

6. The thermoplastic polyester lamination structure according to any of claims 1, 14, 15 or 17, wherein inert particles having a primary particle diameter of more than the primary particle diameter of said aluminum oxide particles (B) are used together.

7. The thermoplastic polyester lamination structure according to claim 6, wherein said inert particles are inorganic particles.

8. The thermoplastic polyester lamination structure according to claim 7, wherein said inert particles are selected from the group consisting of calcium carbonate, silica, titanium oxide, kaoline and calcium phosphate particles.

9. The thermoplastic polyester lamination structure according to claim 6, wherein said inert particles are organic particles.

10. The thermoplastic lamination stucture according to claim 9, wherein said inert particles are selected from crosslinked polymeric particles or internal particles precipitated in a polyester reaction system.

11. The lamination structure according to claims 1, 2, 14, 15, 16 or 17, wherein the rate of secondary particles having a diameter of not more than 0.05 μm determined in a direction parallel to a film surface among agglomerated secondary aluminum oxide particles is not less than 20% and not more than 60% in number distribution of particle diameter.

12. The lamination structure according to claims 1, 2, 14, 15, 16 or 17, wherein the number of protrusions having a height of not less than 10 nm and not more than 60 nm on a film surface of the layer is not less than 500,000/mm² and not more than 5,000,000/mm².

13. The lamination structure according to any of claims 1, 2, 14, 15, 16 or 17, wherein said lamination structure is a base film for a magnetic recording medium.

14. A thermoplastic polyester laminate structure comprising 1) at least one layer of a thermoplastic polyester (A) prepared from i) an acid component mainly comprising an aromatic dicarboxylic acid and a glycol component mainly comprising an aliphatic glycol and ii) θ-type aluminum oxide particles (B), wherein thickness "t" of said layer of a thermoplastic polyester (A) and primary particle diameter "D" of the aluminum oxide particles (B) satisfy the formula $0.1D \leq t \leq 100D$, and 2) at least one layer of another thermoplastic polyester laminated to said layer of thermoplastic polyester (A).

15. A thermoplastic polyester laminate structure comprising at least two layers, said two layers each comprising a thermoplastic polyester (A) prepared from i) an acid component mainly comprising an aromatic dicarboxylic acid and a glycol component mainly comprising an aliphatic glycol and ii) θ-type aluminum oxide particles (B).

16. A thermoplastic polyester laminate structure comprising at least two layers, said two layers each comprising a thermoplastic polyester (A) prepared from i) an acid component mainly comprising an aromatic dicarboxylic acid and a glycol component mainly comprising an aliphatic glycol and ii) a mixture (C) of two or more kinds of aluminum oxide particles different from each other in crystal structure.

17. A thermoplastic polyester lamination structure comprising at least one layer of a thermoplastic polyester (A) prepared from i) an acid component mainly comprising an aromatic dicarboxylic acid and a glycol component mainly comprising an aliphatic glycol and ii) θ-type aluminum oxide particles (B), said particles having an acicular or platy shape.

* * * * *

UNITED STATES PATENT AND TRADEMARK OFFICE
CERTIFICATE OF CORRECTION

PATENT NO.: 6,124,031
DATED: September 26, 2000
INVENTOR(S): Yoshida et al

It is certified that error appears in the above-identified patent and that said Letters Patent is hereby corrected as shown below:

In column 20, at line 14, please change "106 g" to --$10^6$g--; and at approximately line 40, after "resistance", please change " ① " to -- ② --.

In column 22, at approximately line18, please insert --the-- before scratch.

In column 31, at Table 12, at "Damination thickness ($\mu$m), at the subheading "Comparative Example 8" , please change "0.0" to --0.1--.

In Column 32, at line 5, please change "102-type" to --$x$-type--.

Signed and Sealed this

First Day of May, 2001

NICHOLAS P. GODICI

*Attest:*

*Attesting Officer*    *Acting Director of the United States Patent and Trademark Office*